(12) United States Patent
Hansen

(10) Patent No.: US 8,163,082 B2
(45) Date of Patent: Apr. 24, 2012

(54) METHOD AND PLANT FOR MANUFACTURING CEMENT CLINKER

(75) Inventor: Jens Peter Hansen, Aalborg (DK)

(73) Assignee: Flsmidth A/S (DK)

( * ) Notice: Subject to any disclaimer, the term of this patent is extended or adjusted under 35 U.S.C. 154(b) by 770 days.

(21) Appl. No.: 12/299,884

(22) PCT Filed: Mar. 21, 2007

(86) PCT No.: PCT/EP2007/052688
§ 371 (c)(1),
(2), (4) Date: Nov. 6, 2008

(87) PCT Pub. No.: WO2007/128619
PCT Pub. Date: Nov. 15, 2007

(65) Prior Publication Data
US 2009/0133607 A1    May 28, 2009

(30) Foreign Application Priority Data

May 10, 2006  (DK) .................................. 2006 00657

(51) Int. Cl.
  *C04B 7/36*  (2006.01)
(52) U.S. Cl. ............................ 106/739; 106/761; 432/14
(58) Field of Classification Search .................. 106/739, 106/761; 432/14
  See application file for complete search history.

(56) References Cited

U.S. PATENT DOCUMENTS 6,007,331 A * 12/1999 Thomsen et al. ............... 432/58
* cited by examiner

*Primary Examiner* — Paul Marcantoni
(74) *Attorney, Agent, or Firm* — Armstrong Teasdale LLP

(57) ABSTRACT

Manufacturing methods and plants for carrying out methods of manufacturing cement clinker including diverting gases from a separation cyclone for a calcined cement material. The diverted gases are cooled to a temperature of 850° C. or less by introducing raw cement materials into the diverted gas stream.

9 Claims, 2 Drawing Sheets

METHOD AND PLANT FOR MANUFACTURING CEMENT CLINKER

CROSS REFERENCE TO RELATED APPLICATIONS

This application is a filing under 35 U.S.C. §371 of PCT/EP2007/052688 filed Mar. 21, 2007, which claims the benefit of Denmark Application No. PA 2006 00657 filed May 10, 2006, each of which is hereby incorporated by reference in its entirety.

BACKGROUND OF THE INVENTION

The present invention relates to manufacturing plants and methods for manufacturing cement clinker.

A method and a plant of the aforementioned kind are known e.g. from WO 2005/100247. In this known plant a portion of the calcined raw meal is extracted using a small additional cyclone which is positioned parallel to the separation cyclone of the calciner. According to the patent application the quantity of material which is extracted by means of the additional cyclone can be adjusted using a gate which is located in the discharge duct for the gases from the aforementioned additional cyclone. Typically, the temperature of the gases which are diverted via the discharge duct from the additional cyclone will be about 900° C., and in actual practice it has proved to be very difficult to provide a gate which is capable of operating reliably at such a temperature. Also, the gases may contain some amount of alkali which may be quite sticky due to the high temperature, and therefore having a tendency to clog at and around the gate, entailing risk of the gate getting stuck.

BRIEF DESCRIPTION OF THE INVENTION

A method for manufacturing cement clinker is disclosed, by which method cement raw materials are preheated in a preheater, calcined in suspension with hot gases in a calciner, separated from the gases in a cyclone, burned into cement clinker in a kiln and subsequently cooled in a cooler by which method a quantity of calcined raw material with a high content of CaO is extracted via a calcination stage by means of an additional separation cyclone. The extracted, calcined raw material containing CaO may advantageously be used for manufacturing hydrated lime (Ca(OH)2) which according to known technology is used for reducing the SO2 emission from a kiln plant, such as a kiln plant for manufacturing cement clinker. The invention also relates to an apparatus for carrying out the method.

The present inventions provides a method as well as a plant by means of which the aforementioned disadvantage is eliminated or significantly reduced.

According to exemplary embodiments of the invention this is achieved by a method of the kind mentioned above and being characterized in that the gases which are diverted from the additional separation cyclone are cooled to a temperature of maximum 850° C. by means of cement raw materials which are introduced into the gas stream.

It is hereby obtained that the quantity of material which is extracted by means of the additional cyclone can be adjusted by means of known means in a more reliable manner than has hitherto been possible, while also significantly reducing the risk of alkali-induced clogging. This is due to the fact that the lower temperature allows utilization of generally known control means and the fact that the alkali in the gases will condense and settle on particles in the gases at temperatures which are lower than 850° C.

In this connection it should be noted that calcined lime which is cooled to a temperature of less than approximately 870° C. subject to the presence of $CO_2$-containing exit gases will start to recarbonize and hence lose its reactivity with a view to $SO_2$ reduction. It is therefore of paramount importance that the extracted, calcined raw material which is to be used for manufacturing hydrated lime is separated from the $CO_2$-laden gases before it is subjected to cooling.

A further disadvantage of the plant shown in WO 2005/100247 is that its productive capacity is reduced in comparison with a plant without an additional separation cyclone because the gases from the additional separation cyclone are returned to the preheater. This disadvantage can to some extent be reduced by increasing the capacity of the fan which draws the gases through the kiln system. However, this is not an optimum solution, and it is therefore preferred that the gases from the additional separation cyclone are diverted via a separate system comprising a separate fan. Hence it will be possible to maintain the productive capacity of the plant independent of the quantity of calcined raw material being extracted via the additional cyclone.

The separate system may appropriately comprise at least one cyclone stage in which the gases are cooled and separated from the cement raw materials used for cooling before the gases are drawn further through the fan to a filter, if incorporated. The cement raw materials separated from the gases in the lowermost cyclone stage in the separate system are preferentially introduced into a calciner.

As mentioned above the extracted, calcined raw material containing CaO is intended for manufacturing hydrated lime $(Ca(OH)_2)$ which can subsequently be used for reducing the $SO_2$ content in a gas stream such as the exit gases from a kiln plant for manufacturing cement clinker. During this process only the outer surface of the hydrated lime particles will get into contact with the $SO_2$-laden gases targeted for cleaning, and it has emerged that no major improvement of the $SO_2$ reduction is obtained by the particles being hydrated through to the core in relation to particles hydrated at the surface only. It has also emerged that the initial hydration of the surface is a relatively fast process whereas the subsequent hydration of the core is a slow process due to the fact that during hydration the water must be diffused from the particle surface and into the core through a layer of lime already hydrated. According to the invention it is, therefore, preferred that the raw material containing CaO which is intended for manufacturing hydrated lime is calcined in a separate calciner. Hence this raw material can be calcined to optimum degree for the $SO_2$ reduction and independent of the remaining raw material which is to be burned into cement clinker. In this connection it should be noted that the calcination of the material particles is also effected from the surface of the particles and inwards towards the core.

In principle, this additional, separate calciner can be fed with exit gases from the kiln, but it is, however, preferred that it is fed with air from the clinker cooler. This will reduce the amount of alkali in the separate system to a negligible level, significantly reducing the risk of clogging.

The plant for carrying out the method according to the invention comprises a preheater for preheating cement raw materials, a calciner for calcining preheated cement raw materials in suspension with hot gases, a cyclone for separating calcined raw materials from the gases, a kiln for burning cement clinker, a cooler for subsequent cooling of the cement clinker, and an additional separation cyclone for extracting a quantity of calcined raw material with a high content of CaO via a calcination stage, and being characterized in that it comprises means for introducing cement raw materials into the gas stream which is diverted from the additional separation cyclone for cooling the gases to a temperature of maximum 850° C.

Further features of the invention will appear from the description given below and the patent claims.

BRIEF DESCRIPTION OF THE DRAWINGS

The invention will now be explained in further details with reference to the drawing, being diagrammatical, and where.

DETAILED DESCRIPTION OF THE INVENTION

Figure 1:
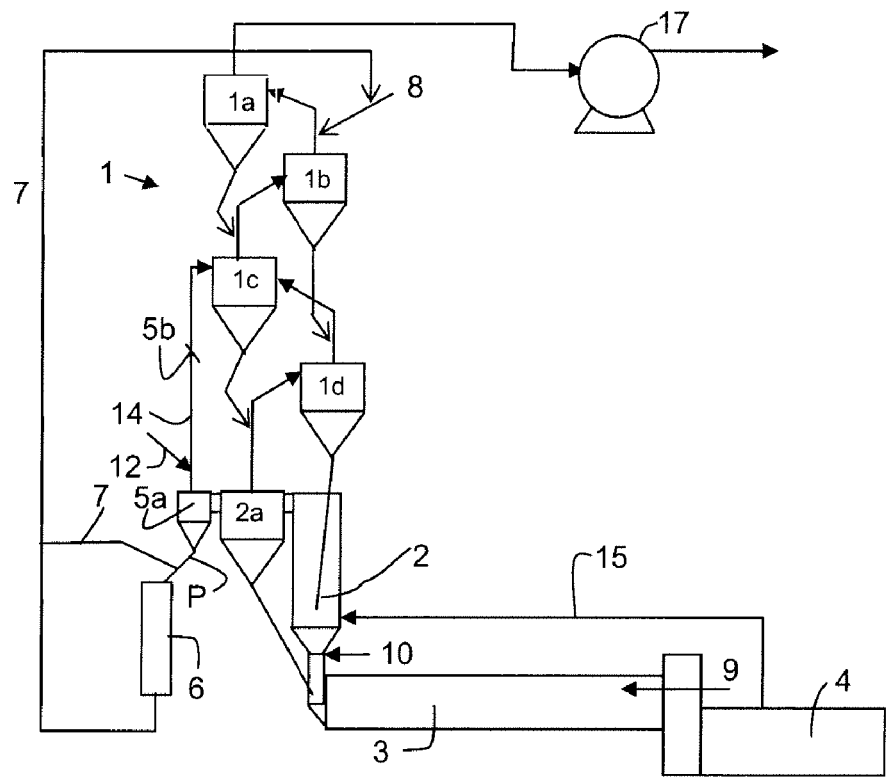
FIG. 1 shows a traditional cement manufacturing plant, in which the method according to the invention is utilized.

In FIG. 1 is seen a cement manufacturing plant which comprises a cyclone preheater 1 with four cyclone stages 1a to 1d, a calciner 2 with a separation cyclone 2a, a rotary kiln 3 and a clinker cooler 4. The plant operates in traditional manner with the raw materials being introduced at an inlet 8 in the inlet duct for the first cyclone stage 1a of the cyclone preheater and they are heated, calcined and burned into clinker by being transported first through the preheater 1, the calciner 2, and then the rotary kiln 3 in counterflow to hot exit gases which are generated at a burner 9 in the rotary kiln 3 and a burner 10 in the calciner 10, respectively, and being drawn through the plant by means of a fan 17. The burned clinker is subsequently cooled in the clinker cooler 4 from which cooling air via a duct 15 is directed to the calciner 2. The plant further comprises an additional separation cyclone 5a which is mounted parallel to the separation cyclone 2a. The separation cyclone 5a may, however, also be serially mounted with the separation cyclone 2a in direct connection with the calciner 2. The quantity of material P which is extracted by means of the cyclone 5a can be adjusted by means of a gate 5b which is located in a discharge duct 14 for the gases from the mentioned additional cyclone 5a. The extracted, calcined raw material P is subsequently directed to a hydration unit 6 which is outside the scope of this patent application and, therefore, not described in further detail, from which it is directed as hydrated lime via a duct 7 to the inlet 8.

According to the invention, the gases which are diverted from the additional separation cyclone 5a via the discharge duct 14 are cooled to a temperature of maximum 850° C. by means of cement raw materials which are introduced into the discharge duct 14 via an inlet 12. Hence the quantity of material which is extracted by means of the additional separation cyclone 5a can be adjusted in reliable manner without any significant risk of clogging, which is mainly ascribable to the fact that the lower temperature makes it possible to use generally known regulating means such as an ordinary regulating gate 5b and the fact that the alkali in the gases will condense and settle on the particles in the gases.

Figure 2:
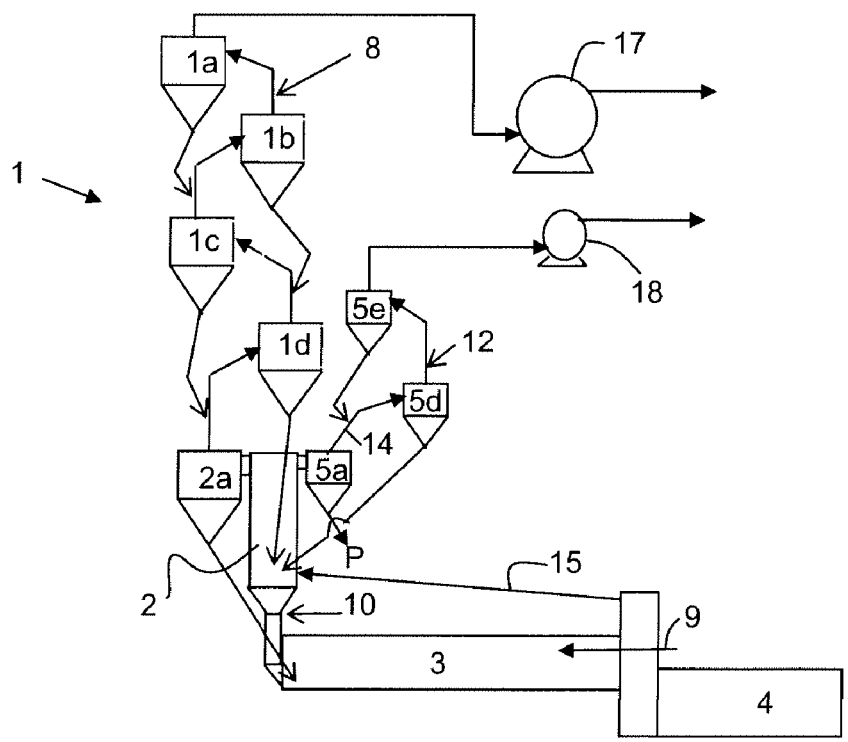
FIG. 2 shows an alternative embodiment of the plant for carrying out the method according to the invention.

In FIG. 2 is seen a cement manufacturing plant which essentially corresponds to the one shown in FIG. 1, and where the same reference designations are used for similar elements. In the plant shown in FIG. 2, the gases are directed from the additional separation cyclone 5a via a separate system comprising a separate fan 18. Hence the productive capacity of the plant can be maintained independently of the quantity of calcined raw material being extracted by means of the additional separation cyclone 5a.

As is seen in FIG. 2, the separate system comprises, in addition to the discharge duct 14, two cyclone stages 5d and 5e into which the raw material for cooling the gases are introduced via the inlet 12 which is located in the gas duct which connects the two cyclone stages in which the gases are cooled and separated from the cement raw materials used for cooling before the gases are drawn through the fan 18 to a filter, if incorporated, which is not shown. The cement raw materials separated from the gases in the lowermost cyclone stage 5d are preferentially directed into the calciner 2 in which it is calcined together with the remaining cement raw material which is fed to the calciner 2 from the cyclone 1d.

The quantity of material P which is extracted by means of the cyclone 5a in the plant shown in FIG. 2, can be adjusted by means of the fan 18, whereas the temperature of the gases which via the discharge duct 14 are directed through the separate system can be adjusted through the quantity and temperature of the raw material which is introduced via the inlet 12. The extracted, calcined raw material P can be directed to a hydration unit similar to that not shown in FIG. 1.

Figure 3:
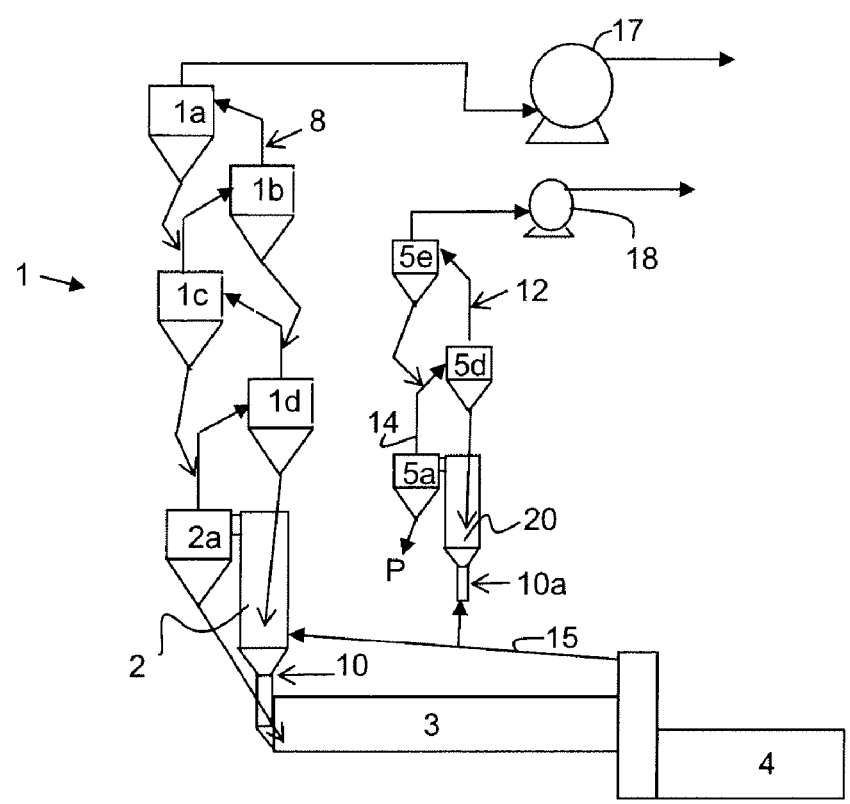
FIG. 3 shows a particularly preferred embodiment of the plant for carrying out the method according to the invention.

In FIG. 3 is seen a cement manufacturing plant which to a great extent corresponds to that shown in FIG. 2, and where the same reference designations are used for similar elements. In the plant shown in FIG. 3, however, the raw material containing CaO intended for manufacturing hydrated lime is calcined in a separate calciner 20. Hence this raw material can be calcined to optimum degree required for the SO2 reduction and independent of the remaining material which is to be burned into cement clinker. It is preferred that the separate calciner 20 is fed with air from the clinker cooler 4 and that it is further fed with fuel via a burner 10a to extent required. Hence the content of alkali in the separate system will be negligible, thereby significantly reducing the risk of clogging. Further, the cement raw materials separated from the gases in the lowermost cyclone stage 5d in the separate system may be introduced into the separate calciner 20. In this embodiment fuel having different physical properties or chemical composition than the fuel introduced via the main burner 10 may be introduced via a burner 10a.

This invention is not limited to the embodiments set forth in the examples and many other embodiments which are within the scope of the mentioned patent claims can be envisaged. Hence any plant which merely comprises a riser duct instead of a specific calciner will also be covered by the patent. Also it is a foregone conclusion that the gases in the discharge duct 14 may for all shown embodiments be cooled to a lower temperature whenever this is desirable or necessary. Therefore, it is quite conceivable in certain situations that the gases will have to be cooled to a temperature of maximum 800, 700, 500 or maybe to a temperature no higher than 300° C. or even lower. In principle, the cooling of gases can be carried out using cement raw materials which are extracted from any location in the process, assuming that its temperature is lower than that which is desired for the cooled gases. However, it is preferred that the raw materials for cooling the gases in the discharge duct 14 are primarily made up of fresh raw materials similar to those being introduced at the inlet 8. Also, it may in certain situation be advantageous to use, particularly as a supplement, filter dust from the filter installation of the cement plant, not shown. The cement raw materials, which are introduced into the gasses, which are diverted from the additional separation cyclone 5a, may have different physical properties or chemical composition than the cement raw materials, which are introduced into the preheater 1 via an inlet 8. Thus, it may also be advantageous to feed raw materials with a higher or lower content of sulphur or organic carbon to the separate string. It may also be advantageous to feed raw materials having a higher or lower content of water to the separate string.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for manufacturing cement clinker comprising:
   preheating cement raw materials in a preheater;
   calcining the cement raw materials in suspension with hot gases in a calciner;
   separating the cement raw materials from the gases in a first cyclone;
   extracting a quantity of calcined raw material containing CaO with an additional separation cyclone;
   burning a remainder of the calcined raw material into cement clinker in a kiln;
   cooling the cement clinker in a cooler;
   diverting the gases from the additional separation cyclone (5a) with a separate system comprising a separate fan; and
   cooling the diverted gases to a temperature of a maximum of 850° C. by introducing cement raw materials into the gas stream.

2. A method according to claim 1, wherein the separate system comprises at least one cyclone stage in which the gases are cooled and separated from the cement raw materials used for cooling before the gases are drawn further through the fan.

3. A method according to claim 2, wherein the cement raw materials separated from the gases in the lowermost cyclone stage in the separate system are introduced into the calciner.

4. A method according to claim 1, wherein the extracted quantity of calcined raw material is calcined in a separate calciner.

5. A method according to claim 4, wherein the separate calciner is fed with air from the clinker cooler.

6. A method according to claim 5, wherein the cement raw materials separated from the gases in the lowermost cyclone stage in the separate system are introduced into the separate calciner.

7. A method according to claim 5, wherein a fuel having different physical properties or chemical composition than a fuel introduced via a main burner is introduced via a burner.

8. A method according to claim 1, wherein the cement raw materials, which are introduced into the gasses, which are diverted from the additional separation cyclone, has different physical properties or chemical composition than the cement raw materials, which are introduced into the preheater via an inlet.

9. A plant for manufacturing cement clinker, the plant comprising:
   a preheater for preheating cement raw materials;
   a calciner for calcining preheated cement raw materials in suspension with hot gases;
   a cyclone for separating calcined raw materials from the gases;
   a kiln for burning cement clinker;
   a cooler for subsequent cooling of the cement clinker;
   an additional separation cyclone for extracting a quantity of calcined raw material containing CaO via a calcination stage; and
   means for introducing cement raw materials into a gas stream which is diverted from the additional separation cyclone for cooling the gases to a temperature of a maximum 850° C., and wherein the gases from the additional separation cyclone are diverted via a separate system comprising a separate fan.

* * * * *